F. H. GIBSON.
ELECTRIC GEAR SHIFTING MECHANISM.
APPLICATION FILED MAR. 25, 1912.
1,433,130.
Patented Oct. 24, 1922.
2 SHEETS—SHEET 1.
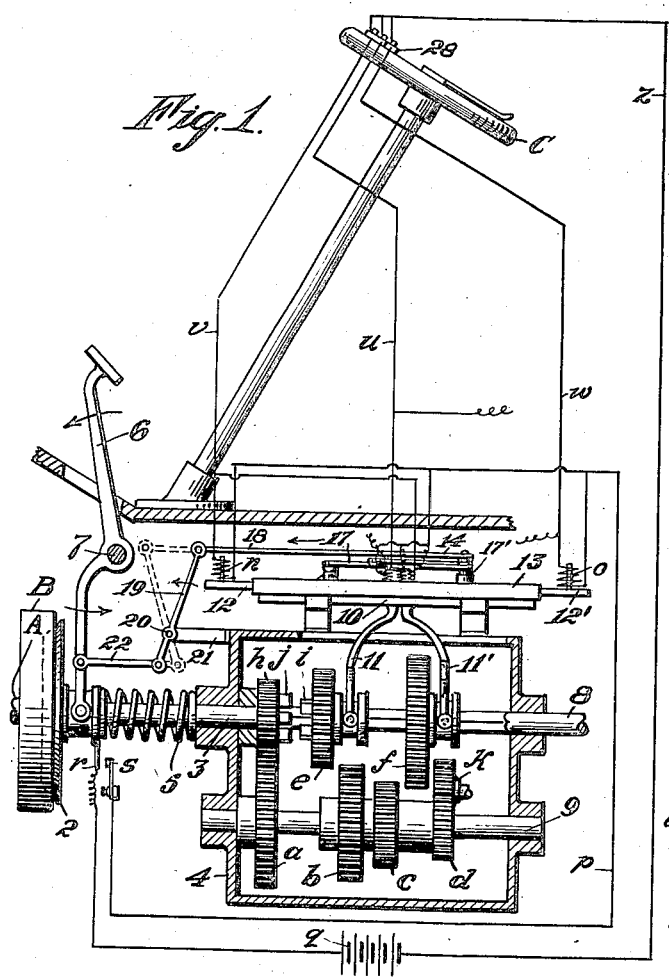
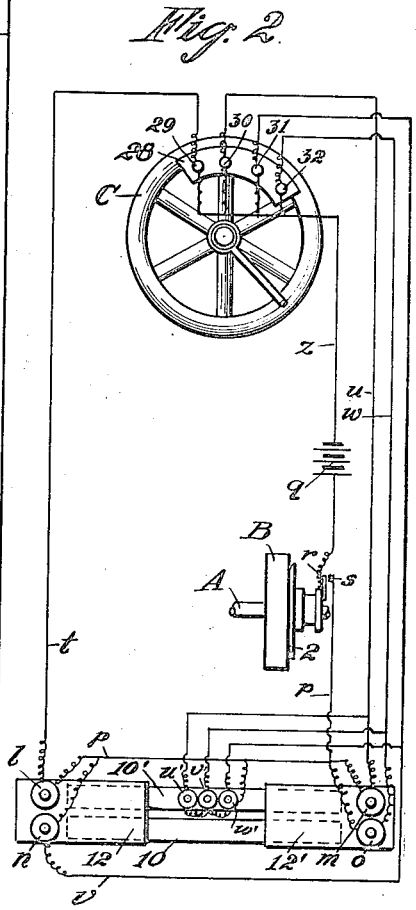
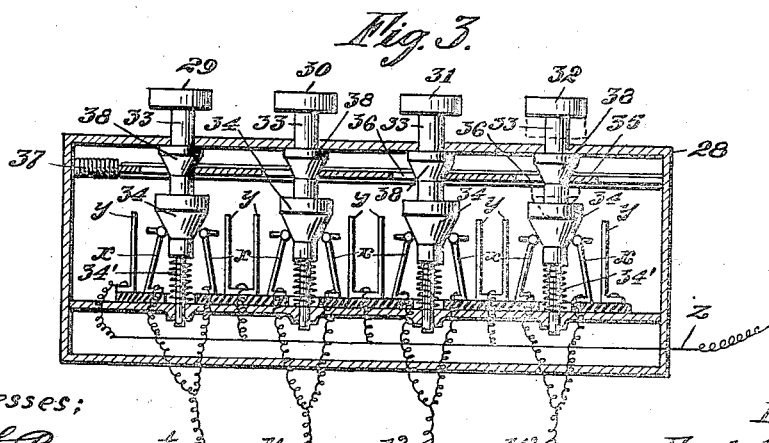
Witnesses:
R. L. Berry
Thos. Castberg
Inventor
Fred H. Gibson.
By G. H. Strong.
Atty

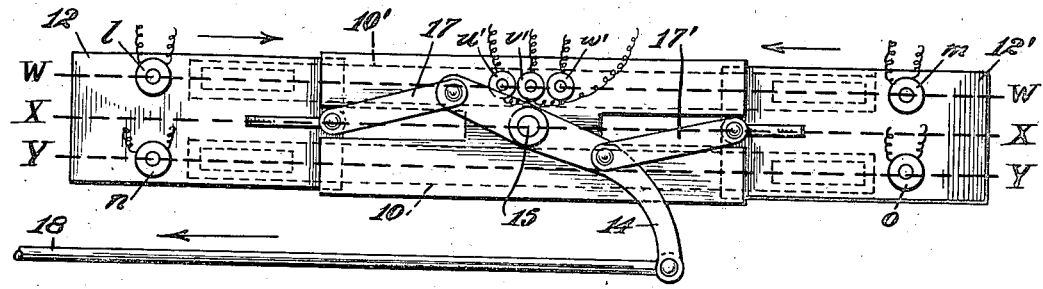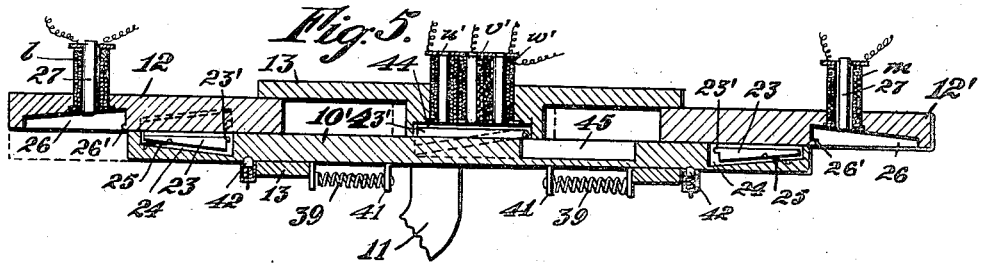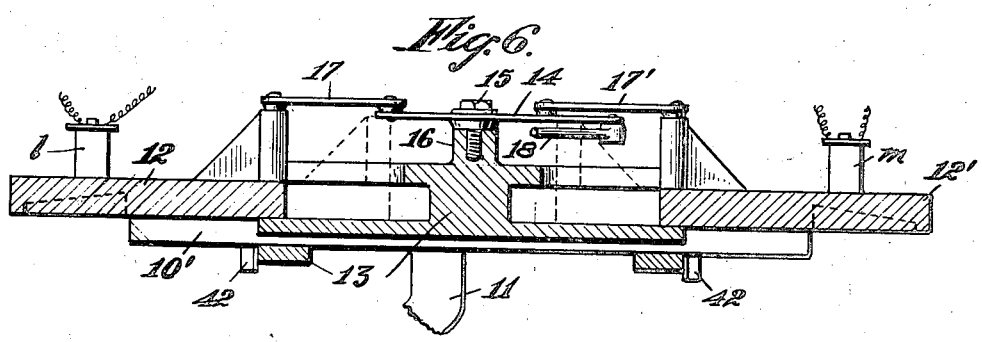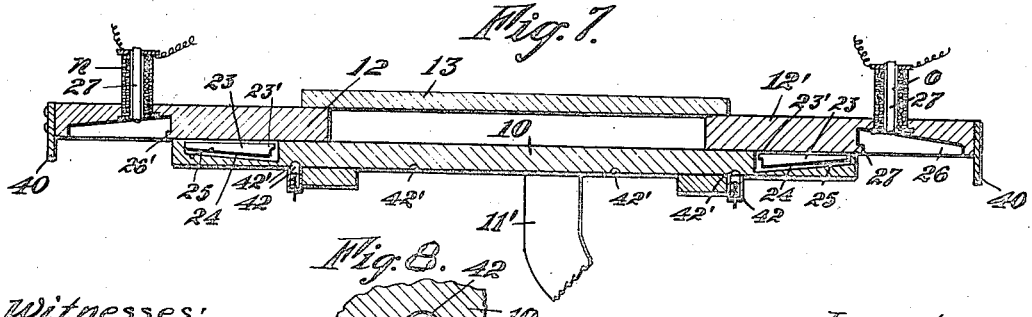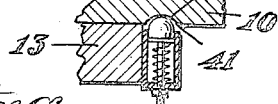

Patented Oct. 24, 1922.

1,433,130

UNITED STATES PATENT OFFICE.

FRED HAROLD GIBSON, OF SAN FRANCISCO, CALIFORNIA, ASSIGNOR OF ONE-HALF TO BENJAMIN SAVANNAH, OF SAN FRANCISCO, CALIFORNIA.

ELECTRIC GEAR-SHIFTING MECHANISM.

Application filed March 25, 1912. Serial No. 685,975.

*To all whom it may concern:*

Be it known that I, FRED HAROLD GIBSON, a citizen of the United States, residing at the city and county of San Francisco, and State of California, have invented new and useful Improvements in Electric Gear-Shifting Mechanism, of which the following is a specification.

This invention relates to an electrically controlled gear shifting mechanism, and particularly pertains to a mechanism for controlling and operating the change speeds or transmission gears of automobiles and the like.

It is the object of this invention to provide a means for shifting transmission gears, such as are employed in automobiles and similar self-propelled vehicles, between the engine shaft and the propeller shaft for changing the speed of, or reversing the propeller shaft, and which invention is designed to do away with the use of the usual hand lever now commonly employed for that purpose. Another object is to provide means for shifting the transmission gears on the operation of the usual clutch arranged between the engine and the transmission, and to provide an electrical mechanism for selecting the various gears in the transmission and connecting them to the shifting mechanism by the manipulation of a switch mechanism disposed on the steering wheel or other convenient portion of the vehicle. A further object is to provide a gear shifting mechanism of the above character, which is simple in construction, efficient in operation, and which is adapted to be applied to most automobiles and other vehicles in which the selective type of transmission is employed.

The invention consists of the parts, and the combination and construction of parts as hereinafter more fully described and claimed, having reference to the accompanying drawings, in which—

Fig. 1 is a diagram illustrating the application of the invention to the transmission mechanism of an automobile, showing the latter in elevation.

Fig. 2 is a diagrammatic plan view showing the electrical apparatus.

Fig. 3 is a vertical section of the selective switch mechanism.

Fig. 4 is a plan view of the gear shifting device.

Fig. 5 is a vertical section on the line W—W of Fig. 4.

Fig. 6 is a vertical section on the line X—X, of Fig. 4.

Fig. 7 is a vertical section on the line Y—Y of Fig. 4.

Fig. 8 is a detail sectional view of a deten..

In the drawings, A represents an engine shaft having a fly-wheel B thereon, and 2 indicates a clutch member mounted on a shaft 3 extending into a transmission gear-case 4, and which clutch member is designed to be thrown in and out of engagement with the fly-wheel B to rotate the shaft 3 from the engine shaft A. The clutch member 2 is normally held in engagement with the fly wheel B by means of a helical spring 5 wound on the shaft 3 and bearing between the case 4 and a grooved hub on the clutch member 2. A foot-lever 6, pivoted at 7, is arranged with its lower end engaging the hub on the clutch member 2 and is provided as a means for throwing the clutch member 2 out of engagement with the fly-wheel B in opposition to the spring 5, in the manner common in automobile construction.

Mounted in the case 4 is a propeller shaft 8 and a counter-shaft 9; the latter having gears $a$—$b$—$c$ and $d$ keyed thereon and the former having gears $e$ and $f$ mounted to slide longitudinally on a squared portion thereof.

A pinion $h$ on the drive-shaft 3 is meshed with the gear $a$ in such manner as to rotate the counter-shaft 9 continuously when the drive shaft 3 is revolved, but at a less speed than the latter. The propeller shaft 8 is disposed in alignment with the drive-shaft 3 and is designed to be connected directly therewith, so as to be rotated in unison with the drive shaft, by means of laterally extending teeth $i$ on the gear $e$, which are engageable with similar teeth $j$ on the pinion $h$. The gear $e$ is designed to be shifted on the propeller shaft 8 in either direction so as to dispose it in any one of three positions, namely, with the teeth $i$ meshing with the teeth $j$ on the pinion $h$ for direct drive, or with the teeth on its periphery meshing with the gear $b$, to drive the propeller shaft 8 through the counter-shaft 9, at any intermediate speed, or in a neutral position out of mesh with the gear $b$ and with the teeth $i$ out of engagement with the teeth $j$, so that no motion will be given the shaft 8 therethrough.

The gear *f* is slidable on the propeller shaft 8, independent of the gear *e* and is designed to be thrown in and out of mesh with the gear *c* and in and out of mesh with an idler-gear *k* meshed with the gear *d*; the gear *f* being positioned between the gears *c* and *d* when it is intended to be inoperative. When the gear *f* is in mesh with the gear *c*, the propeller shaft 8 will be rotated from the counter-shaft 9 at slow speed and when it meshes with the idler-gear *k* its direction of rotation will be reversed.

The foregoing described apparatus constitutes the well-known clutch and selective transmission mechanism commonly employed in self-propelled vehicles, and operates in the usual well-known manner to start and stop the vehicle, vary its speed, and change its direction of travel.

The essence of this invention resides in a mechanism for shifting the gears *e* and *f* by the action of the spring 5 in throwing the clutch member 2 unto engagement with the fly-wheel B after the clutch member has been thrown out of engagement with the fly-wheel by means of the foot-lever 6. This mechanism comprises a pair of reciprocally mounted bars 10—10' which are connected to grooved hubs formed on the gears *e* and *f*, by means of yokes 11—11', respectively; reciprocal carriages 12—12' operated by means of the foot-lever 6, and electrically operated means for connecting the carriages to the bars.

The bars 10—10' are here shown as mounted in a guide frame 13, disposed adjacent the case 4, and are designed to be reciprocated horizontally in the guide frame 13 in a longitudinal direction, as will be later described; the carriages 12—12' being also mounted in the guide frame 13 to reciprocate parallel to the bars 10—10' in close proximity thereto.

The carriages 12—12' are reciprocated in opposite directions in relation to each other by means of a lever 14 which is pivoted at 15 to swing horizontally on a post 16, mounted on the guide-frame 13; the lever 14 being connected to the carriages 12—12' on opposite sides of its pivotal mounting 15, by means of links 17—17' which are pivotally connected at their inner ends to the lever 14 and at their outer ends to standards on the carriages 12—12', as particularly shown in Figs. 4 and 6.

One end of the lever 14 is extended beyond its connection with the link 17' and is pivotally attached to a connecting rod 18, the opposite end of which is pivotally connected to the upper end of a vertically disposed lever 19, pivoted at 20 on a bracket 21, or other suitable support. The lower end of the lever 19 is connected to the lower portion of the foot-lever 6 by means of a link 22, in such manner that when the foot-lever 6 is operated to throw the clutch member 2 out of engagement with the fly-wheel B, the lever 19 will be rocked on its pivot 20 to actuate the lever 14 in such direction as to move the carriages 12 and 12' inwardly toward each other, and to move the carriages 12 and 12' outwardly when the clutch member 2 is thrown into engagement with the fly-wheel B by means of the spring 5.

Means are provided for connecting either end of the bars 10—10' to the carriages 12—12', when the latter are in their innermost positions, so as to cause the bars 10—10' to move outwardly with the carriages 12 and 12', as occasion may require. This means is here shown as consisting of horizontally extending iron blocks 23 mounted in recesses 24 formed in the upper faces of the bars 10 to 10' adjacent to their outer ends, as particularly shown in Figs. 5 and 7. The blocks 23 are connected to the bars 10 and 10' by means of plate springs 25; one end of each spring 25 being connected to the underside of a block 23 and the other end connected to the bar 10 or 10', in the bottom of the recesses 24. The plate springs 25 act to normally retain the blocks 23 in their lowermost positions within the recesses 24.

Recesses 26 are formed in the undersides of the carriages 12 and 12', corresponding to and adapted to register with the recesses 24 in the bars 10 and 10', and mounted on the carriages 12 and 12' is a series of vertically disposed electro-magnets, indicated at *l*, *m*, *n* and *o*, one of which magnets is disposed over each of the recesses 26 with its core 27 extending into the recesses, as shown in Figs. 5 and 7.

The electro-magnets, *l*, *m*, *n* and *o* are designed to be energized when the carriages 12 and 12' are disposed in their innermost positions so as to cause the cores 27 thereof to act on the iron blocks 23; (the latter forming armatures), in such manner as to cause the blocks 23 to enter the recesses 26 in the carriages 12 and 12' and thereby form a connection between the carriages 12 and 12' and the bars 10 and 10', so that when the former are moved outward the latter will be caused to move in unison therewith.

One terminal of each of the magnets *l*, *m*, *n* and *o* connects with a conductor *p*, which in turn connects with one terminal of a battery *q* through a pair of contact members *r* and *s*, which contact members form a switch for making and breaking a circuit through the conductor *p*, as will be later described. The other terminals of the magnets *l*, *m*, *n* and *o* connect with conductors *t*, *u*, *v* and *w*, respectively, which lead to a series of spring contact members *x*, disposed in a suitable case 28 which is preferably mounted on a steering wheel C, but which may be disposed at any other point convenient to the operator. The contact members $x$ are designed to be thrown into contact with contact plates $y$ which are electrically connected to a conductor $z$ leading to the other terminal of the battery $q$, so as to complete a circuit through the electro-magnets $l$, $m$, $n$ or $o$, as may be desired.

The contact members $x$ are normally out of contact with the contact plates $y$ and may be thrown into contact therewith in any suitable manner. The mechanism here shown for that purpose consists of a series of push-buttons indicated at 29, 30, 31 and 32, which are mounted on the upper ends of vertically reciprocable stems 33 mounted in the casing 28. The stems 33 carry tapered shoulders 34, the inclined faces of which are adapted to contact the upper ends of the spring contact members $x$, as particularly shown in Fig. 3, in such manner that when the stems 33 are depressed, by the operation of the push button thereon, the tapered shoulders will act to press the contact members $x$, outwardly into contact with the plates $y$.

Helical springs 34' are wound on the stems 33 below the tapered shoulders 34 and bear in an upwardly direction on the stems 33 so as to normally retain them in their uppermost positions. Means are provided for retaining the stems 33 in their lowermost positions in opposition to the springs 34', so as to indicate which of the buttons 29, 30, 31 or 32 was last depressed. This means is here shown as consisting of a horizontally reciprocable plate 35, mounted in the casing 28 and provided with a series of elongated perforations 36 through which the stems 33 extend; the plate 35 being normally disposed in such position that one end of the slots 36 will contact the stems 33; a spring 37 being attached to one end of the plate 35 and exerting a pull upon the latter to normally retain it in the position shown in Fig. 3.

Mounted on each of the stems 33 are flanges 38, which are normally disposed above the plate 35; the flanges 38 being beveled on their under-sides in such manner that when the stem 33 is depressed, the beveled face of the flange therein bears against the end of a slot 36, and will act to force the plate 35 backwardly in opposition to the spring 37 and allow the shoulder 38 to pass to the underside of the plate 35. The spring 37 will now act to restore the plate 35 to its normal position above the flange 38 on the depressed stem 33 thereby locking the stem in its lowermost position, as indicated in dotted lines in Fig. 3. When the plate 35 is reciprocated by the depression of any of the stems 33, the stem previously depressed will be released and caused to move to its normal uppermost position by means of the spring 34' thereon.

Means are provided for retaining the bars 10 and 10' in their normal or central position when the transmission gears $e$ and $f$ are in their intermediate positions; this means being here shown as consisting of double-acting helical springs 39, arranged to act on the bar 10', and members 40 on the carriages 12 and 12', which are adapted to act on the bar 10 to restore it to its normal position when the carriages 12 and 12' are retracted. The springs 39 bear between the guide frame 13 and projections 41 carried on the underside of the bar 10', as shown in Fig. 5, in such manner as to normally hold the bar 10' in its central position.

Spring detents 42, of any suitable description, are mounted on the guide frame 13 and are designed to engage sockets or grooves 42' formed on the undersides of the bars 10 and 10' in such manner as to insure the bars 10 and 10' coming to a stop in the proper position, at their innermost and outermost points.

When the transmission gears $e$ and $f$ are in their normal or intermediate positions and the clutch member 2 is in engagement with the fly-wheel B, as shown in Fig. 1, the bars 10 and 10' will be in their central position and the carriages 12 and 12' will be in their outermost positions, as shown in full lines in Figs. 4, 5, 6 and 7.

When it is desired to drive the vehicle on the slow speed, the gear $f$ on the propeller shaft 8 is thrown into mesh with the gear $c$ on the counter-shaft 9. This is accomplished by first throwing the clutch member 2 out of engagement with the fly-wheel B by the depression of the foot-lever 6 in the direction of the arrow thereon in Fig. 1, which action moves the clutch member 2 in a rearward direction and causes the contact member $r$, which is carried on the hub of the clutch member 2, to come into contact with the contact member $s$, so as to permit of the passage of the electrical current through the conductor $p$ when any of the push-buttons 29, 30, 31 or 32 is depressed. The moment the clutch member 2 is thrown out of engagement with the fly-wheel B the push-button 31 is depressed so as to complete a circuit from the battery $q$, through the conductors $z$ and $v$, electro-magnet $n$, and conductor $p$ to energize the electro-magnet $n$.

The carriage 12 on which the electro-magnet $n$ is mounted, being previously moved to its rearmost position by the rearward movement of the lower portion of the lever 6 acting through the link 22, lever 29, connecting-rod 18, lever 14, and link 17, the core 27 of the electro-magnet $n$, will be positioned over the iron block 23 in the recess 24 adjacent to the left end of the bar 10.

The energization of the magnet $n$ causes the iron block 23 to move upward into the recess 26 thereabove in the carriage 12 so that when the latter moves outward, which occurs when the foot-lever 6 is released, and the spring 5 restores the clutch 2 into engagement with the fly-wheel B, so as to move the bar 10 outward in unison with the carriage 12 in such direction as to move the gear $f$ into engagement with the gear $c$. The bar 10 will remain in its outermost position to hold the gear $f$ in mesh with the gear $c$ as long as the carriage 12 is retained in its outermost position.

When it is desired to throw the gear $f$ out of engagement with the gear $c$ and throw it into engagement with the idler gear $k$ to reverse the direction of rotation of the propeller shaft 8, the clutch member 2 is thrown out of engagement with the fly-wheel B by the operation of the foot-lever 6, as before described, thereby retracting the carriages 12 and 12' and restoring the bar 10 to its normal or central position; the bar 10 being moved back to its central position by means of the engaging member 40 on the carriage 12 which will engage the end of the bar 10 so as to cause the latter to move back in unison with the carriage 12. This being done, the push-button 32 is depressed so as to complete a circuit through the conductors $z$ and $w$, electro-magnet $o$, the conductor $p$, and the battery $q$, thereby energizing the magnet $o$ when the carriage 12' is in its innermost position, so as to cause the iron block 23 to move upward into the recess 26 into the carriage 12' below the electro-magnet $o$. This action locks the bar 10 to the carriage 12' so that when the latter is moved outward, on the release of the foot-lever 6, and by the action of the spring 5, it restores the clutch 2 into engagement with the fly-wheel B so as to move the gear $f$ to the right into engagement with the idler gear $k$ where it remains during the time the carriage 12' is retained in its outermost position.

From the foregoing it will be seen that whenever the bar 10 is in its outermost position in either direction the gear $f$ will be in mesh with either the gear $c$ or the idler gear $k$, and when the carriages 12 and 12' are moved inwardly in readiness to operate either the bar 10 or 10' and the gears $f$ and $e$ connected therewith, the bar 10 will be restored to its normal position so as to position the gear $f$ in its intermediate position before another shifting operation of the transmission gears can be accomplished.

Means are provided for retaining the bar 10' in such position as to hold the teeth $i$ in constant mesh with the teeth $j$, irrespective of the operation of the carriages 12 and 12', so that the clutch 2 may be thrown in and out at will without disconnecting the propeller shaft 8 from the driveshaft 3. This is accomplished by means of a block 43, pivotally mounted at one end in a recess 44 formed in the frame 13. The block 43 normally rests upon the upper face of the bar 10' and is designed to gravitate into a recess 45 formed in the bar 10' when the latter is in the outermost position assumed when the teeth $i$ are in engagement with the teeth $j$; the outer end of the block 43 engaging one end of the slot or recess 45 to hold the bar 10' against retraction, in opposition to the springs 39.

When the bar 10' is thus engaged the carriages 12 and 12' may be reciprocated at will without effecting the bar 10', thus permitting the operator to throw the clutch 2 in and out of engagement with the fly-wheel B, as desired, when the vehicle is being driven at the high speed.

Means are provided for automatically throwing the block 43 out of engagement with the bar 10' when any one of the electro-magnets $m$, $n$ or $o$ are energized, preparatory to shifting either of the gears $e$ or $f$ into the slow speed, intermediate speed, or reverse position, so that the bar 10' will be restored to its normal central position by means of the springs 39 when the carriages 12 and 12' are in their retracted positions.

This means is here shown as consisting of a series of electro-magnets $u'$, $v'$ and $w'$, which are mounted on the guide frame 13 and are positioned in alignment with their cores extending into the recess 45 in which the block 43 is mounted, and in such position that when any one of the electro-magnets $u'$, $v'$ or $w'$ is energized the block 43 will be drawn into the recess 45 out of engagement with the bar 10', thereby permitting the latter to be restored to its normal position by the action of the springs 39. The energization of the magnets $u'$, $v'$ and $w'$ is accomplished by the depression of any one of the buttons 30, 31 or 32; one terminal of each of the magnets $u'$, $v'$, and $w'$ connecting with the conductors $u$, $v$, and $w$ respectively and the other terminal of each of the magnets $u'$, $v'$ and $w'$ connecting with the conductor $p$ leading from the battery $q$.

It will be seen when the bar 10' is in its outermost position and the block 43 is engaged therewith that when any one of the magnets $u'$, $v'$ or $w'$ is energized by the depression of any one of the buttons 30, 31 or 32, the block 43 will be drawn out of engagement with the bar 10', providing the clutch 2 is previously thrown out of engagement with the fly-wheel B so as to throw the contact member $r$ into contact with the contact member $s$.

The contact members $r$ and $s$ form a make and break or switch device by means of which the conductor $p$ will be broken when the clutch 2 is in its engaged position, thereby preventing the flow of current through the various conductors and magnets should any of the push-buttons 29, 30, 31 or 32 be operated while the clutch is in its engaged position; the various magnets $l$, $m$, $n$, and $o$, $u'$, $v'$, and $w'$ being capable of being energized only when the clutch 2 is in its disengaged position.

By providing a means for holding the push-buttons 29, 30, 31 and 32 in their depressed positions, the operator is enabled to determine which of the magnets $l$, $m$, $n$ or $o$ was last energized, thereby indicating the positions of the transmission gears $e$ and $f$.

Means are provided for preventing the iron blocks 23 from being retracted into the recesses 24 and thereby become disengaged from the carriages 12—12' when the magnets $l$, $m$, $n$ and $o$ are de-energized, which occurs when the clutch 2 is restored to its normal engagement with the fly-wheel B. This means consists of a horizontally extending flange or projection 23' on the outer end of each of the blocks 23 which is adapted to extend over and be engaged by a similar flange 26' formed on the carriages 12—12' and extending into the recesses 26 therein.

From the foregoing it will be seen that I have provided a mechanism for controlling the shifting of the transmission gears in self-propelled vehicles, which obviates the use of hand levers or similar devices and in which the shifting of the gears is accomplished by means of the spring 5 which normally retains the clutch 2 in its engaged position with the fly-wheel B.

Having thus described my invention, what I claim and desire to secure by Letters Patent is—

1. The combination with a clutch-operating mechanism, of a reciprocable member connected with and operable by said mechanism, a shiftable gear, and electrically-controlled means for connecting said reciprocable member to the gear to shift the position thereof.

2. The combination with a gear shifting mechanism having a shiftable gear, and a clutch-operating mechanism, of electrically-controlled means for connecting said clutch-operating mechanism and said shiftable gear whereby the latter may be shifted by the operation of the former.

3. In a mechanism, the combination of a drive-shaft and a driven shaft, a countershaft in constant drive connection with the driven shaft, a propeller shaft, inter-engageable gears on the driven, counter and propeller shaft, a clutch between the drive shaft and driven shaft, means for operating the clutch, means actuated by the clutch-operating means for shifting the gears and means for selectively connecting the gear shifting means with the clutch-operating means.

4. In a device of the class described, the combination of a drive-shaft and a driven shaft, a countershaft in constant drive connection with the driven shaft, a propeller shaft, inter-engageable gears on the driven, counter, and propeller shafts, a clutch between the drive-shaft and the driven shaft, means for operating the clutch, normally inoperative mechanism for shifting the gears by said clutch-operating means, and electrical means for rendering said mechanism operative.

5. The combination with a series of gears, including a shiftable gear, a clutch, means for operating said clutch, electrically-controlled means for shifting the shiftable gear operated by the clutch-operating means, including a reciprocable member attached to the gear, a reciprocable member attached to the clutch-operating mechanism, and means operated by an electric current for connecting said reciprocable members together.

6. The combination with a series of gears, including a shiftable gear, a clutch, means for operating said clutch, electrically-controlled means for shifting the shiftable gear operated by the clutch-operating means, including a reciprocable member attached to the gear, a reciprocable member attached to the clutch-operating mechanism, means operated by an electric current for connecting said reciprocable members together, and switch mechanism operated by the clutch for breaking the electric current.

7. The combination with a series of gears, including a shiftable gear, a clutch, means for operating said clutch, electrically-controlled means for shifting the shiftable gear operated by the clutch-operating means, including a reciprocable member attached to the gear, a reciprocable member attached to the clutch-operating mechanism, means operated by an electric current for connecting said reciprocable members together, comprising a series of electro-magnets on one of said reciprocable members, and armatures on the other of said members.

8. The combination with a series of gears, including a shiftable gear, a clutch, means for operating said clutch, electrically-controlled means for shifting the shiftable gear operated by the clutch-operating means, including a reciprocable member attached to the gear, a reciprocable member attached to the clutch-operating mechanism, means operated by an electric current for connecting said reciprocable members together, comprising a series of electro-magnets on one of said reciprocable members, armatures on the other of said members, and push-button means for controlling the energization of the electro-magnets.

9. The combination with a series of gears, including a shiftable gear, a clutch, means for operating said clutch, electrically-controlled means for shifting the shiftable gear operated by the clutch-operating means, including a reciprocable member attached to the gear, a reciprocable member attached to the clutch-operating mechanism, means operated by an electric current for connecting said reciprocable members together, comprising a series of electro-magnets on one of said reciprocable members, armatures on the other of said members, push-button means for controlling the energization of the electro-magnets, and means whereby the energization of a magnet will cause the armature on one of the reciprocable members to engage the other reciprocable member.

10. The combination with a series of gears, including a shiftable gear, a clutch, means for operating said clutch, electrically-controlled means for shifting the shiftable gear operated by the clutch-operating means, including a reciprocable member attached to the gear, a reciprocable member attached to the clutch-operating mechanism, means operated by an electric current for connecting said reciprocable members together, comprising a series of electro-magnets on one of said reciprocable members, armatures on the other of said members, push-button means for controlling the energization of the electro-magnets, and means whereby the energization of a magnet will cause the armature on one of the reciprocable members to engage the other reciprocable member so that when the clutch is operated in one direction to move the reciprocable member connected therewith the reciprocable member attached to the gear will move in unison therewith.

11. The combination with a series of gears, including a shiftable gear, a clutch, means for operating said clutch, electrically-controlled means for shifting the shiftable gear operated by the clutch-operating means, including a reciprocable member attached to the gear, a reciprocable member attached to the clutch-operating mechanism, means operated by an electric current for connecting said reciprocable members together, comprising a series of electro-magnets on one of said reciprocable members, armatures on the other of said members, push-button means for controlling the energization of the electro-magnets, means whereby the energization of a magnet will cause the armature on one of the reciprocable members to engage the other reciprocable member so that when the clutch is operated in one direction to move the reciprocable member connected therewith the reciprocable member attached to the gear will move in unison therewith, and mechanical means for restoring the gear shifting mechanism to its normal position.

12. The combination with a series of gears, including a shiftable gear, a clutch, means for operating said clutch, electrically-controlled means for shifting the shiftable gear operated by the clutch-operating means, including a reciprocable member attached to the gear, a reciprocable member attached to the clutch-operating mechanism, means operated by an electric current for connecting said reciprocable members together, comprising a series of electro-magnets on one of said reciprocable members, armatures on the other of said members, push-button means for controlling the energization of the electro-magnets, means whereby the energization of a magnet will cause the armature on one of the reciprocable members to engage the other reciprocable member so that when the clutch is operated in one direction to move the reciprocable member connected therewith the reciprocable member attached to the gear will move in unison therewith, mechanical means for restoring the gear shifting mechanism to its normal position, and means for controlling the electric current to the electro-magnets by the operation of the clutch.

13. The combination with a series of gears, including a shiftable gear, a clutch, means for operating said clutch, electrically-controlled means for shifting the shiftable gear operated by the clutch-operating means, including a reciprocable member attached to the gear, a reciprocable member attached to the clutch-operating mechanism, means operated by an electric current for connecting said reciprocable members together, comprising a series of electro-magnets on one of said reciprocable members, armatures on the other of said members, push-button means for controlling the energization of the electro-magnets, means whereby the energization of a magnet will cause the armature on one of the reciprocable members to engage the other reciprocable member so that when the clutch is operated in one direction to move the reciprocable member connected therewith the reciprocable member attached to the gear will move in unison therewith, mechanical means for restoring the gear shifting mechanism to its normal position, means for controlling the electric current to the electro-magnets by the operation of the clutch, and means co-operating with said push-buttons for indicating which electro-magnet in the series has been energized.

14. The combination with a series of gears, including a shiftable gear, a clutch, means for operating said clutch, electrically controlled means co-operating with the clutch operating means for shifting the shiftable gear, said electrically controlled means including means for indicating the position of said shiftable gear.

15. In a gear shifting mechanism, the combination with a shift rod, and two members movable longitudinally of the rod in opposite directions, of means for selectively connecting the said members to the shift rod.

In testimony whereof I have hereunto set my hand in the presence of two subscribing witnesses.

FRED HAROLD GIBSON.

Witnesses:
   JOHN H. HERRING,
   WALTER REIMERS.